United States Patent
Ma et al.

(10) Patent No.: US 12,103,066 B2
(45) Date of Patent: Oct. 1, 2024

(54) HIGH-TEMPERATURE-RESISTANT CASTING SYSTEM AND PREPARATION METHOD THEREOF

(71) Applicant: CHANGZHOU WANXING PAPER PLASTIC CO., LTD., Changzhou (CN)

(72) Inventors: Guohong Ma, Changzhou (CN); Zhaoyuan Ma, Changzhou (CN); Zhaoxiang Ma, Changzhou (CN); Weiming Yu, Changzhou (CN); Gongwei Dai, Changzhou (CN); Chenhang Ma, Changzhou (CN)

(73) Assignee: CHANGZHOU WANXING PAPER PLASTIC CO., LTD., Changzhou (CN)

( * ) Notice: Subject to any disclaimer, the term of this patent is extended or adjusted under 35 U.S.C. 154(b) by 64 days.

(21) Appl. No.: 17/722,481

(22) Filed: Apr. 18, 2022

(65) Prior Publication Data
US 2022/0234094 A1  Jul. 28, 2022

Related U.S. Application Data

(63) Continuation-in-part of application No. PCT/CN2020/095492, filed on Jun. 11, 2020.

(30) Foreign Application Priority Data

Oct. 18, 2019  (CN) .......................... 201910990928.1

(51) Int. Cl.
| | |
|---|---|
| *B22C 1/02* | (2006.01) |
| *B22C 1/18* | (2006.01) |
| *B22C 9/08* | (2006.01) |

(52) U.S. Cl.
CPC ................ *B22C 1/02* (2013.01); *B22C 1/186* (2013.01); *B22C 9/082* (2013.01)

(58) Field of Classification Search
CPC  B22C 9/08; B22C 9/082; B22C 9/086; B22C 1/00
See application file for complete search history.

(56) References Cited

U.S. PATENT DOCUMENTS

2011/0056643 A1    3/2011   Duncan et al.

FOREIGN PATENT DOCUMENTS

| CN | 104084530 A | 10/2014 |
|---|---|---|
| CN | 105642833 A | 6/2016 |

(Continued)

*Primary Examiner* — Kevin E Yoon
(74) *Attorney, Agent, or Firm* — Ming Jiang; MM IP SERVICES LLC

(57) ABSTRACT

A high-temperature-resistant casting system comprises following casting elements in a connection relationship: a sprue cup (1) and a down sprue (2) connected with a lower end of the sprue cup, wherein the other end of the down sprue is connected with one end of a filtering element (6), the other end of the filtering element is connected with a three-way pipe (3), openings in two sides of the three-way pipe are connected with one end of an inlet section of a runner (4), and one end of an outlet section of the runner is connected with a tapered elbow (5). The casting elements comprise the following components in percentage by weight: 41-51% of a refractory fiber, 40-51% of a silicate fiber and 5-19% of a binder. A preparation method of the high-temperature-resistant casting system is further provided.

4 Claims, 2 Drawing Sheets

(56) References Cited

FOREIGN PATENT DOCUMENTS

| CN | 205599876 U | * | 9/2016 | |
|---|---|---|---|---|
| CN | 107096891 A | | 8/2017 | |
| CN | 107838375 A | * | 3/2018 | ............ B22C 9/082 |
| CN | 108580796 A | | 9/2018 | |
| CN | 108993016 A | | 12/2018 | |
| CN | 109622883 A | | 4/2019 | |
| CN | 110560638 A | | 12/2019 | |
| WO | WO-2008072772 A1 | * | 6/2008 | ............ B22C 9/086 |

* cited by examiner

HIGH-TEMPERATURE-RESISTANT CASTING SYSTEM AND PREPARATION METHOD THEREOF

CROSS-REFERENCE TO RELATED APPLICATIONS

The application claims priority to Chinese patent application No. 201910990928.1, filed on Oct. 18, 2019, the entire contents of which are incorporated herein by reference.

TECHNICAL FIELD

The present invention belongs to the field of casting, and particularly relates to a high-temperature-resistant casting system and a preparation method thereof.

BACKGROUND ART

Foundry industry is a basic industry of mechanical industry. Foundry plays a very important role in mechanical industry. Foundry technology which is one of agent technologies in sustainable development of national economy is a supply side of mechanical products. It is shown by data that there have been 22 thousand foundry enterprises in China in 2015 and they have provided 25000000 tons of castings for all departments in national economy. As Made in China has reputation abroad, mechanical manufacturing industry flourishes. With respect to products featuring large casting size, heavy weight, complicated shape and high technical requirement in foundry industry, only high-temperature-resistant casting elements are mounted to pour high-temperature molten iron or high-temperature molten steel, can the product quality be guaranteed. As it is needed to bear circulation of high-temperature liquid metals for a long time, the casting elements need to have a property of being high-temperature-resistant.

At present, the vast majority of foundry enterprises at home use conventional casting elements made from ceramic refractory materials. A carrying mode of the product is abutment, which is likely to generate sand leakage to affect the product quality. In case of severe sand leakage, a casting product is scrapped. Furthermore, the casting product is high in cost, heavy in weight and troublesome to recycle.

In view of this, the present invention is provided.

SUMMARY

In order to solve the problem that elements in the casting system in the prior art cannot resist high temperatures, the present invention is intended to provide a high-temperature-resistant casting system and a preparation method thereof.

The present invention is realized according to the technical scheme as follows:

A high-temperature-resistant casting system includes casting elements in the following connection relationship: a sprue cup and a down sprue connected with the lower end of the sprue cup, where the other end of the down sprue is connected with one end of a filtering element, the other end of the filtering element is connected with a three-way pipe, openings in two sides of the three-way pipe are connected with one end of an inlet section of a runner, and one end of an outlet section of the runner is connected with a tapered elbow; and the filtering element includes two filter cartridges in an embedded connection and a filter screen, where one of the two filter cartridges is connected with the down sprue, the other one of the two filter cartridges is connected with the three-way pipe, and the filter screen is arranged at a connection of the two filter cartridges and is aligned with a through hole of the down sprue.

The casting element includes the following components in percentage by weight:
41-51% of a refractory fiber,
40-51% of a silicate fiber and
5-19% of a binder.

Preferably, the casting elements include the following components in percentage by weight:
45% of a refractory fiber,
45% of a silicate fiber and
10% of a binder.

Preferably, the refractory fiber is obtained by mixing a paper fiber, a carbon fiber and asbestos in a mass ratio of (1-15):(20-35):(10-15).

Preferably, the binder is a mixture of sodium silicate, mullite, graphite and brown fused alumina.

The other objective of the present invention is to provide a preparation method of the high-temperature-resistant casting system, including the following steps:

(1) material preparing: adding the refractory fiber, the silicate fiber and the binder that are acceptable into a stirrer in the mass ratio to be stirred to obtain a combination material;

(2) diluting: adding water into the combination material to dilute the combination material till the mass concentration of the combination material is 1% to obtain diluted slurry;

(3) forming: forming the diluted slurry by a forming machine to obtain a wet form body of the casting element;

(4) drying: putting the formed wet form body of the casting element in a drying chamber, and evaporating and dehydrating the wet form body subjected to circular hot air drying till a moisture content is 50-70% to obtain a blank of the casting element;

(5) shaping: putting the blank of the casting element in a shaping machine for hot-pressing shaping; and (6) burr inspecting: removing burrs of the shaped blank of the casting element, and meanwhile, inspecting products one by one and assembling the products into the high-temperature-resistant casting system.

The present invention has the following beneficial effects:

(1) Raw materials of the high-temperature-resistant casting element prepared by the present invention are fiber products. The prepared casting elements prepared from paper fiber, carbon fiber and silicate fiber in a specific proportion has excellent high-temperature resistance, and high-temperature molten iron at 1500-1750° C. can pass through smoothly when the casting element is used in the casting system.

(2) The binder used in the present invention is not added with components such as organic resins, so that there is no shortcoming that the organic resins are easily aged under a condition of high temperature and generate irritative and toxic gases. Inorganic materials such as pollution-free and high-temperature-resistant brown fused alumina and graphite are used, where graphite can enhance the high-temperature resistance of the casting element and brown fused alumina with a small heat conductivity coefficient plays a heat insulation role, thereby improving the thermal insulation performance of the casting element. On the other hand, brown fused alumina with a function of preventing graphite from being oxidized is cooperated with sodium silicate, so that the bonding effect of the binder is improved, the strength of the casting elements is enhanced, energy-saving and environmental-friendly effects are achieved, and over 90% of exhaust gas and waste residues of a jobbing foundry can be reduced. Meanwhile, the quality of castings can be improved, the rate of finished products of the castings can be increased by 5-8%, and it assists high quality development of green casting in China, making a great contribution.

DETAILED DESCRIPTION OF THE INVENTION

Further detailed description of the present invention will be made below by the drawings and specific embodiments.

Figure 1:
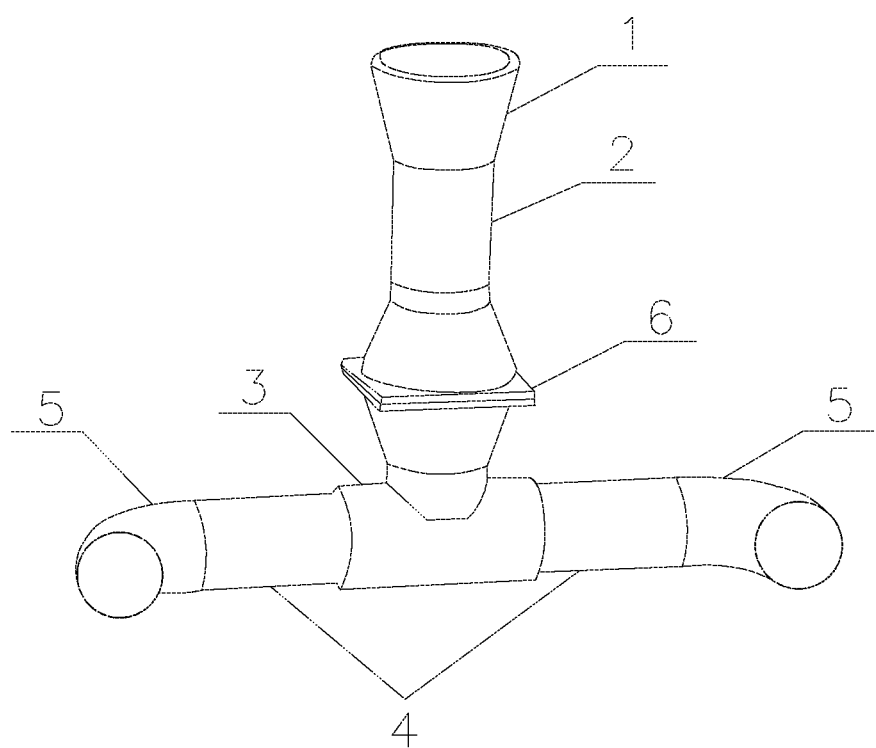
FIG. 1 is a schematic diagram of a high-temperature-resistant casting system of the present invention.

As shown in FIG. 1, a high-temperature-resistant casting system includes following casting elements in a connection relationship: a sprue cup 1 and a down sprue 2 connected with a lower end of the sprue cup 1, wherein the other end of the down sprue 2 is connected with one end of a filtering element 6, the other end of the filtering element 6 is connected with a three-way pipe 3, openings in two sides of the three-way pipe 3 are connected with one end of an inlet section of a runner 4, and one end of an outlet section of the runner 4 is connected with a tapered elbow 5.

Figure 2:
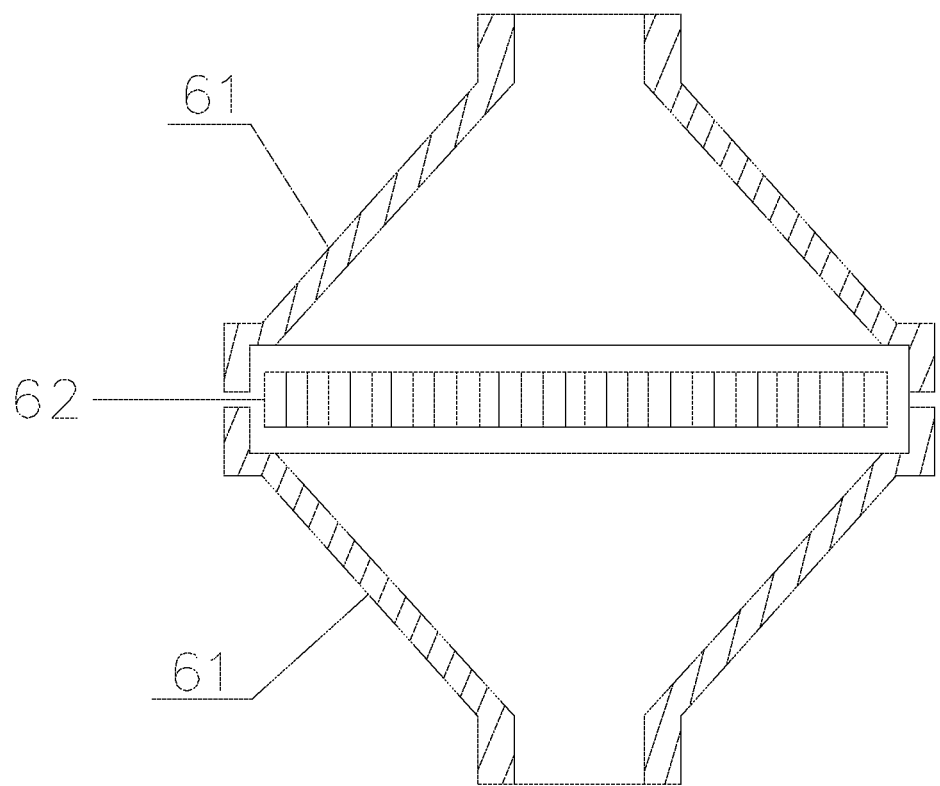
FIG. 2 is an assembly schematic diagram of a filtering element of the present invention.

As shown in FIG. 2, the filtering element 6 includes two filter cartridges 61 in embedded connection and a filter screen 62, one of the two filter cartridges 61 is connected with the down sprue 2, the other one of the two filter cartridges 61 is connected with the three-way pipe 3, and the filter screen 62 is arranged at the connection between the two filter cartridges 61 and is aligned with a through hole of the down sprue 2.

Example 1

(1) material preparing: the refractory fiber, the silicate fiber and the binder that were acceptable were added into a stirrer in the mass ratio of 45%:45%:10% to be stirred, so as to obtain a combination material;
the refractory fiber was obtained by mixing a paper fiber, a carbon fiber and asbestos in a mass ratio of 10:25:10;
the binder was a mixture of 60% of sodium silicate, 10% of mullite, 5% of graphite and 25% of brown fused alumina;
(2) diluting: water was added into the combination material to dilute the combination material till the mass concentration of the combination material is 1% to obtain diluted slurry;
(3) forming: the diluted slurry was formed by a sprue cup forming machine to obtain a wet form body of the casting element (a sprue cup 1);
(4) drying: the formed wet form body of the casting element (the sprue cup 1) was put in a drying chamber, and the wet form body subjected to circular hot air drying was evaporated and dehydrated till a moisture content was 50-70% to obtain a blank of the casting element (the sprue cup 1);
(5) shaping: the blank of the casting element (the sprue cup 1) was put in a shaping machine for hot-pressing shaping; and
(6) burr inspecting: burrs of the shaped blank of the casting element (the sprue cup 1) were removed, and meanwhile, products were inspected one by one and the products that were acceptable were the product casting elements (the sprue cup 1).

Other casting elements: the down sprue 2, the three-way pipe 3, the runner 4, the tapered elbow 5 and the filtering element 6 were prepared by the same preparation method, and the rates of finished products of the casting elements were increased by 5-8%.

Through test, when the casting elements obtained in the embodiment 1 were used in the high-temperature-resistant casting system of the present invention, molten iron at 1750° C. could pass through smoothly.

Example 2

(1) material preparing: the refractory fiber, the silicate fiber and the binder that were acceptable were added into a stirrer in the mass ratio of 41%:51%:8% to be stirred, so as to obtain a combination material;
the refractory fiber was obtained by mixing a paper fiber, a carbon fiber and asbestos in a mass ratio of 2:25:15;
the binder is a mixture of 60% of sodium silicate, 10% of mullite, 5% of graphite and 25% of brown fused alumina;
(2) diluting: water was added into the combination material to dilute the combination material till the mass concentration of the combination material is 1% to obtain diluted slurry;
(3) forming: the diluted slurry was formed by a sprue tube forming machine to obtain a wet form body of the casting element (a sprue cup 1);
(4) drying: the formed wet form body of the casting element (the sprue cup 1) was put in a drying chamber, and the wet form body subjected to circular hot air drying was evaporated and dehydrated till a moisture content was 50-70% to obtain a blank of the casting element (the sprue cup 1);
(5) shaping: the blank of the casting element (the sprue cup 1) was put in a shaping machine for hot-pressing shaping; and
(6) burr inspecting: burrs of the shaped blank of the casting element (the sprue cup 1) were removed, and meanwhile, products were inspected one by one and the products that were acceptable were the product casting elements (the sprue cup 1).

Other casting elements: the down sprue 2, the three-way pipe 3, the runner 4, the tapered elbow 5 and the filtering element 6 were prepared by the same preparation method, and the rates of finished products of the casting elements were increased by 5-8%.

Through test, when the casting elements obtained in the embodiment 2 were used in the high-temperature-resistant casting system of the present invention, molten iron at 1650° C. could pass through smoothly.

Comparative Example 1

Different from the example 1, the brown fused alumina in the binder in the example 1 was omitted, relative proportions of other components were unchanged, and the preparation method was as same as that in the embodiment 1.

Through test, when the casting elements obtained in the comparative example 1 were used in the high-temperature-resistant casting system of the present invention, molten iron at 1500° C. deformed severely when passing through smoothly, so that the high-temperature-resistance was insufficient.

Comparative Example 2

Different from the example 1, the graphite in the binder in the example 1 was omitted, relative proportions of other components were unchanged, and the preparation method was as same as that in the embodiment 1.

Through test, when the casting elements obtained in the comparative example 2 were used in the high-temperature-resistant casting system of the present invention, molten iron at 1500° C. deformed severely when passing through smoothly, so that the high-temperature-resistance was insufficient.

It is to be understood that those of ordinary skill in the art can make improvements or alternations according to the above description, and all the improvements and alternations shall fall within the scope of protection of the appended claims of the present invention.

What is claimed is:

1. A high-temperature-resistant casting system, comprising following casting elements in a connection relationship: a sprue cup and a down sprue connected with a lower end of the sprue cup, wherein the other end of the down sprue is connected with one end of a filtering element, the other end of the filtering element is connected with a three-way pipe, openings in two sides of the three-way pipe are connected with one end of an inlet section of a runner, and one end of an outlet section of the runner is connected with a tapered elbow; and the casting elements comprise the following components in percentage by weight: 41-51% of a refractory fiber, 40-51% of a silicate fiber and 5-19% of a binder, wherein the refractory fiber is obtained by mixing a paper fiber, a carbon fiber and asbestos in a mass ratio of (1-15): (20-35):(10-15), and wherein the binder is a mixture of sodium silicate, mullite, graphite and brown fused alumina.

2. The high-temperature-resistant casting system according to claim 1, wherein the filtering element comprises two filter cartridges in embedded connection and a filter screen, one of the two filter cartridges is connected with the down sprue, the other one of the two filter cartridges is connected with the three-way pipe, and the filter screen is arranged at the connection between the two filter cartridges and is aligned with a through hole of the down sprue.

3. The high-temperature-resistant casting system according to claim 1, wherein the casting elements comprise the following components in percentage by weight: 45% of a refractory fiber, 45% of a silicate fiber and 10% of a binder.

4. A preparation method of the high-temperature-resistant casting system according to claim 1, comprising the following steps:
(1) material preparing: adding the refractory fiber, the silicate fiber and the binder that are acceptable into a stirrer in the mass ratio to be stirred, so as to obtain a combination material;
(2) diluting: adding water into the combination material to dilute the combination material till the mass concentration of the combination material is 1% to obtain diluted slurry;
(3) forming: forming the diluted slurry by a forming machine to obtain a wet form body of the casting element;
(4) drying: putting the formed wet form body of the casting element in a drying chamber, and evaporating and dehydrating the wet form body subjected to circular hot air drying till a moisture content is 50-70% to obtain a blank of the casting element;
(5) shaping: putting the blank of the casting element in a shaping machine for hot-pressing shaping; and
(6) burr inspecting: removing burrs of the shaped blank of the casting element, and meanwhile, inspecting products one by one and assembling the products into the high-temperature-resistant casting system.

* * * * *